Oct. 1, 1968  MIYAJI TOMOTA ET AL  3,404,330
DC CONSTANT-VOLTAGE DEVICE
Filed Oct. 21, 1964  2 Sheets-Sheet 1
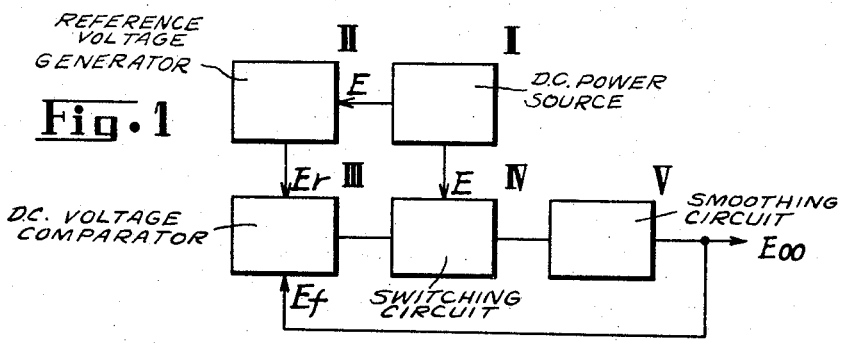
Fig. 1
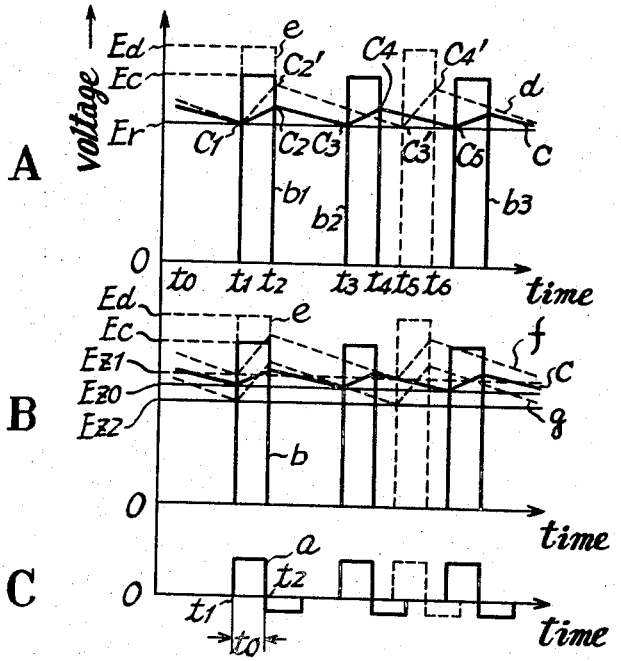
Fig. 2
Fig. 3
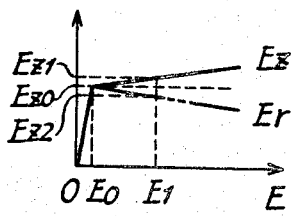
INVENTORS
Miyaji Tomota
Kenzo Sasaoka
Akihisa Hashimota
ATTORNEYS INVENTORS
Mijaji Tomoto
Kenzo Sasaoka
Akihisa Hashimoto

ATTORNEYS

United States Patent Office 3,404,330
Patented Oct. 1, 1968

3,404,330
DC CONSTANT-VOLTAGE DEVICE
Miyaji Tomota, Kenzo Sasaoka, and Akihisa Hashimoto, Musashino-shi, Tokyo, Japan, assignors to Kabushikikaisha Yokogawa Denki Seisakusho (Yokogawa Electric Works Ltd.), Musashino-shi, Tokyo, Japan, a corporation of Japan
Filed Oct. 21, 1964, Ser. No. 405,465
Claims priority, application Japan, Oct. 23, 1963, 38/56,833
3 Claims. (Cl. 323—22)

ABSTRACT OF THE DISCLOSURE

A direct current constant voltage device for operation from a power source of direct current voltage. The device includes circuit means to develop a reference voltage which is serially added in opposite polarity to a feedback voltage which is taken from the output of the device. The reference voltage and feedback voltage are applied to a blocking oscillator circuit to control the operation thereof. As the voltage at the output of the device decreases and becomes smaller than a predetermined value, a switching circuit is rendered operative to connect the DC power source to the output terminals through a filler circuit.

This invention relates to a DC constant-voltage device, more particularly to a device which produces a constant DC voltage output unaffected by variations in the output voltage of a DC power source.

In electrical measuring apparatus, especially in portable ones a DC power source such as a dry element battery is employed which is of relatively low voltage output. However, such power source is disadvantageous in that the output voltage varies with variations in a load and lowers with the lapse of time.

An object of this invention is to provide a device which produces a constant DC voltage unaffected by the variation in the output voltage of a DC power source.

Another object of this invention is to provide a device which converts a DC output of low voltage into a constant DC voltage of high voltage.

A further object of this invention is to provide a device which highly efficiently converts the output of a DC power source into a constant DC voltage unaffected by the variation in the output voltage of the source.

Other objects, features and advantages of this invention will be apparent from the following description taken in conjunction with the accompanying drawings, in which:

FIGURE 1 is a block diagram, for explaining a device of this invention;

FIGURES 2 and 3 are characteristic curves, for explaining the operation of an embodiment of the device according to this invention;

FIGURE 5 is a circuit diagram illustrating another embodiment of the device in which a boosting transformer shown in FIGURE 4 is dispensed with.

In FIGURE 1, I is a DC power source, II a reference voltage generator circuit, III a DC voltage comparator, IV a switching circuit, and V a smoothing circuit. The reference voltage generator II is supplied with current from the DC power source I and produces at its output end a DC voltage $E_r$ which is maintained substantially at a constant value independently of variations in the output voltage E of the DC power source I. This DC voltage $E_r$ will hereinafter be referred to as a reference voltage in this specification. The voltage comparator III is provided with means for comparing two DC voltages applied to its input and a blocking-type oscillator which maintains its oscillation only while the difference between the two DC voltages is on the condition mentioned later. The voltage comparator means are supplied with the aforementioned reference DC voltage $E_r$ and a divided voltage $E_f$ of the output voltage $E_{00}$ of the smoothing circuit V and produces the difference voltage between them. The oscillator is supplied with the difference voltage and oscillates only on the condition that the difference voltage $E_r - E_f$ is zero or more, producing a pulse voltage signal at its output end. The DC pulse voltage signal is applied to the control grid of the switching circuit IV, by which the output two terminals thereof become conductive therethrough. The switching circuit IV is inserted into the output circuit of the above-mentioned DC power source. The smoothing circuit V smoothes the pulse train voltage which is formed by converting the output of the DC power source I by means of the switching circuit IV, producing a DC voltage signal $E_{00}$ at its output end. This DC voltage signal $E_{00}$ is impressed to an external load. The DC signal $E_f$ that the DC voltage signal $E_{00}$ has been divided is applied to the aforementioned DC voltage comparator III.

Figure 4:
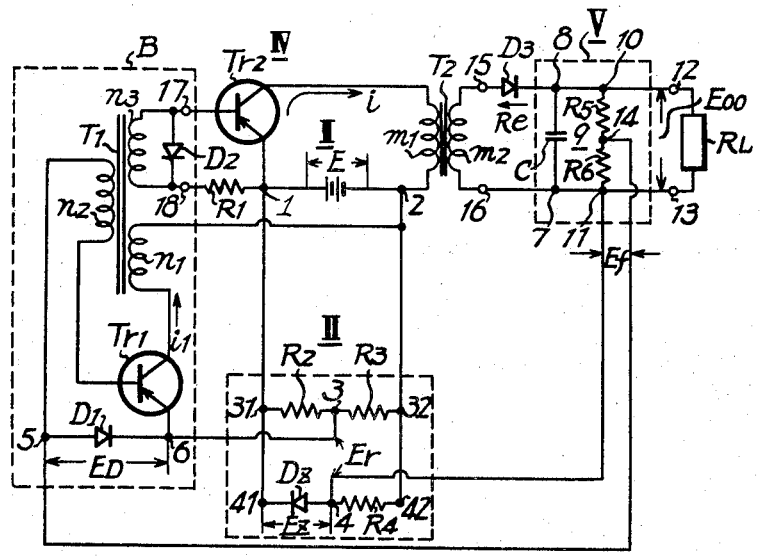
FIGURE 4 is a circuit diagram of the embodiment of this invention.

Referring now to FIGURE 4, the connection of an embodiment of this invention will hereinbelow be explained. To the output end of a DC power source I, a series circuit of resistors $R_2$ and $R_3$ and another series circuit of a Zener diode $D_z$ and a resistor $R_4$ are connected in parallel, forming a reference voltage generator circuit II. By the output of the DC power source I a voltage of a reverse direction is always applied between the terminals of the Zener diode $D_z$ to produce a constant voltage between its terminals. Between the connecting point 3 of the resistors 2 and 3 and that 4 of the Zener diode $D_z$ and the resistor $R_4$, a constant reference DC voltage $E_r$ appears which is scarcely affected by some variations in the output voltage E of the DC power source 1.

Between the connecting point 14 of dividing resistors $R_5$ and $R_6$ connected to the output ends 10 and 11 of a smoothing circuit generally indicated by V in parallel to a capacitor C and the end 11 of the resistor $R_6$, a DC voltage $E_f$ is produced in which DC voltage $E_{00}$ produced between the output ends 10 and 11 has been divided at a suitable ratio. The DC voltage $E_f$ and the output voltage $E_r$ of the reference voltage generator circuit II are added in series in opposite polarities to each other and impressed to the input terminals of the voltage comparator III, namely the electrodes 5 and 6 of a diode $D_1$ in a blocking oscillator B. In the figure the reference voltage $E_r$ is obtained by a constant-voltage generator circuit utilizing the output voltage of the DC power source I, but another independent constant-voltage source may be used as the reference voltage $E_r$.

In the blocking oscillator B the collector electrode of a transistor $Tr_1$ is connected to one end 2 of the output of the DC power source I through a primary coil $n_1$ of a transformer $T_1$ and the emitter electrode is connected through the resistor $R_2$ to the other end 1 of the output of the power source. Between the base electrode and the emitter electrode of the transistor $Tr_1$, a secondary coil of the transformer $T_1$ and the doide $D_1$ are connected in series. Thus, the transistor $Tr_1$ and the primary and secondary coils $n_1$ and $n_2$ of the transformer $T_1$ form a blocking type oscillator circuit. The aforesaid difference voltage $(E_r - E_f)$ is applied between the electrodes of the diodes $D_1$ inserted into the base-emitter circuit of this oscillator circuit. Where $E_f > E_r$ and a voltage, which is in reverse polarity with respect to the electrodes of the diode $D_1$, is applied between the emitter and base electrodes of the transistor $Tr_1$, the electrodes of the diode $D_1$, the transistor $Tr_1$ remains non-conductive between its emitter and collector. Then the voltage $E_f$ gradually decreases and as soon as it becomes equal to or a little smaller than the reference voltage $E_r$, the transistor $Tr_1$ becomes conductive between its emitter and collector in a moment due to the base current build-up caused by the positive action of transformer $T_1$ thereby to flow a shot of pulse current $i_1$ of a certain pulse width to the primary coil $n_1$ of the transformer $T_1$. While $(E_r - E_f) \leqq 0$, the pulse current repeatedly flows in the primary coil $n_1$ intermittently at a peculiar cycle determined by the circuit constant of the oscillator circuit. Every time the pulse current flows, an alternating pulse voltage signal which attenuates in one cycle appears in a tertiary coil $n_3$ of the transformer $T_1$. Since the both ends of the tertiary coil $n_3$ are terminated by the diode $D_2$, when the voltage of normal polarity to the diode $D_2$ is induced in the tertiary coil, they are short-circuited by the diode $D_2$, whereas the voltage of the reverse polarity only is produced between the both ends of the tertiary coil $n_3$. One end of the tertiary coil $n_3$ is connected to the base electrode of a switching transistor $Tr_2$ and the other end is connected through a resistor $R_1$ to the emitter electrode. The emitter of the switching transistor $Tr_2$ (PNP) is connected to the positive side output end 1 of the DC power source I, while the collector is connected to the negative side output end 2 of the DC power source I through a primary coil $m_1$ of a boosting transformer $T_2$. The transistor $Tr_2$ becomes conductive between its emitter and collector only while a polarity of the voltage in the tertiary coil $n_3$ is positive to the emitter and negative to the base, thereby supplying currents from the DC power source I to the primary coil $m_1$ of the transformer $T_2$.

A secondary coil $m_2$ of the boosting transformer $T_2$ is connected through a rectifier $D_3$ to a voltage smoothing circuit V. The voltage smoothing circuit V consists of the parallel circuit of the capacitor C and the dividing resistor 9 composed of the resistors $R_5$ and $R_6$. The capacitor C is connected in parallel to an external load $R_L$ through output ends 12 and 13. When the switching transistor $Tr_2$ becomes conductive between its emitter and collector by the output pulse of the blocking-type oscillator B and the impulse current flows to the primary coil $m_1$ of the transformer $T_2$, an alternating impulsive voltage is induced in the secondary coil $m_2$. The amplitude of the pulse voltage is proportionate to the output voltage of the DC power source. Of the aforesaid alternating pulse voltages, only a voltage of positive half cycle is applied to the electrode of the capacitor C through the diode rectifier $D_3$ and a voltage of negative half cycle is cut off by the rectifier $D_3$. Accordingly, the capacitor C is charged with a unidirectional current based upon the voltage of the positive half cycle. The resistance value of the load $R_L$ is selected fully greater than that of the voltage divider 9 and almost all the charge stored in the capacitor C flows through the resistor elements $R_5$ and $R_6$ of the voltage divider 9. Furthermore, the capacitance of the capacitor C and the resistance value of the voltage divider 9 are selected sufficiently large and a smoothed DC voltage $E_{00}$ appears at the both ends of the voltage divider 9. The voltage $E_{00}$ is applied to the load $R_L$ through the output terminals 12 and 13.

The connecting point 14 of the resistors $R_6$ and $R_5$ of the voltage divider 9 is connected to one end 5 of the diode $D_1$ and one end 11 of the resistor $R_6$ is connected to the connecting point 4 of the Zener diode $D_z$ and the resistor $R_4$ of the reference voltage generator circuit II. Thus, the divided output voltage $E_f$ of the output voltage $E_{00}$ and the output voltage $E_r$ of the reference voltage generator circuit II are added in opposite polarities and applied between the electrodes 5 and 6 of the diode $D_1$ of the blocking oscillator B. Assuming that the capacitance value of the capacitor C of the smoothing circuit V is C and the resistance values of the resistor elements $R_5$ and $R_6$ of the voltage divider 9 and the load $R_L$ are respectively $r_5$, $r_6$ and $r_L$ and that $r_L$ is fully greater than $(r_5 + r_6)$. The discharging time constant $\tau$ of the smoothing circuit V determined by the capacitance of the capacitor C and the resistor elements $R_5$ and $R_6$ can be expressed by $C(r_5 + r_6)$. In case the oscillating period of the blocking oscillator B is T when the lead wire between the feed point 14 of the dividing resistor 9 for $E_f$ and the end 5 of the diode $D_1$ is opened and the blocking oscillator B freely continues to oscillate, the discharging time constant $\tau$ of the smoothing circuit V has been selected sufficiently greater than T. When the oscillator B freely oscillates the capacitor C of the smoothing circuit V repeats charging and discharging in synchronism with the free oscillation and produces between its electrodes a DC voltage having substantially no ripple in its equilibrium condition. The mean value of the DC voltage is related to the output voltage E of the DC power source I, the boosting ratio of the boosting transformer $T_2$ and so on. Then, the dividing ratio $$\frac{r_6}{r_5 + r_6}$$

of the dividing resistor 9 in the smoothing circuit V is selected as follows. That is, the ratio is selected to be greater than the voltage $E_r$ produced at the both ends of the resistor $R_6$ of the dividing resistor 9 even when the DC power source voltage is at a minimum value.

The Zener diode $D_z$ of the reference voltage generator circuit II is connected through the resistor element $R_4$ across the output ends 1 and 2 of the DC power source I and the output voltage E of the DC power source I is impressed between the electrodes of the diode $D_z$ in opposite polarities. Where the amplitude of the output voltage E is less than the Zener voltage $E_{z0}$ peculiar to the Zener diode $D_z$, substantially no current flows to this diode. Therefore, a voltage $E_z$ between the terminals of the diode is substantially equal to the voltage E. On the other hand, the voltage E increases and when the amplitude of the voltage impressed to the diode $D_z$ exceeds the Zener voltage $E_{z0}$ the diode becomes conductive and the inter-electrode voltage $E_z$ of the diode $D_z$ is maintained substantially at the Zener voltage $E_{z0}$ and hardly varies even if the voltage E varies. Strictly speaking, however, the voltage $E_z$ also increase a little in this range with an increase in the voltage E. The relationship of E vs. $E_z$ is illustrated by the line $E_z$ in FIGURE 3. In this circuit, however, it is desirable that the reference voltage $E_r$ is constant independently of the voltage E or slightly decreases with the increase in the voltage E as shown by the chain line $E_r$ in FIGURE 3 (the reason for which will be explained later), and hence a series circuit of the resistor elements $R_2$ and $R_3$ is connected between the output ends 1 and 2 of the DC power source I as illustrated in FIGURE 4 and a voltage appearing between the connecting point of the elements $R_2$ and $R_3$ and that 4 of the diode $D_z$ and the resistor element $R_4$ is utilized as the reference voltage $E_r$.

In the circuit shown in FIGURE 4 the boosting transformer $T_2$ is used for obtaining a higher voltage than the output voltage E of the DC power source I at the output ends 12 and 13, and the rectifier $D_3$ is necessary attendant upon the transformer $T_2$. Where the output terminal voltage $E_{00}$ may be less than the DC voltage E of the DC power source I, the transformer $T_2$ and the rectifier $D_3$ are dispensed with and the circuit may be formed in such a manner that the collector of the switching transistor $Tr_2$ is connected to one electrode 8 of the capacitor C through a charging resistor $R_c$ and the negative side output end 2 of the DC power source I is connected to the other electrode 7 thereby to charge the capacitor C directly with the output current of the DC power source I. The circuit of such connection is shown in FIGURE 5 and the operation of this invention will hereinafter be explained with reference to FIGURE 5.

Figure 5:
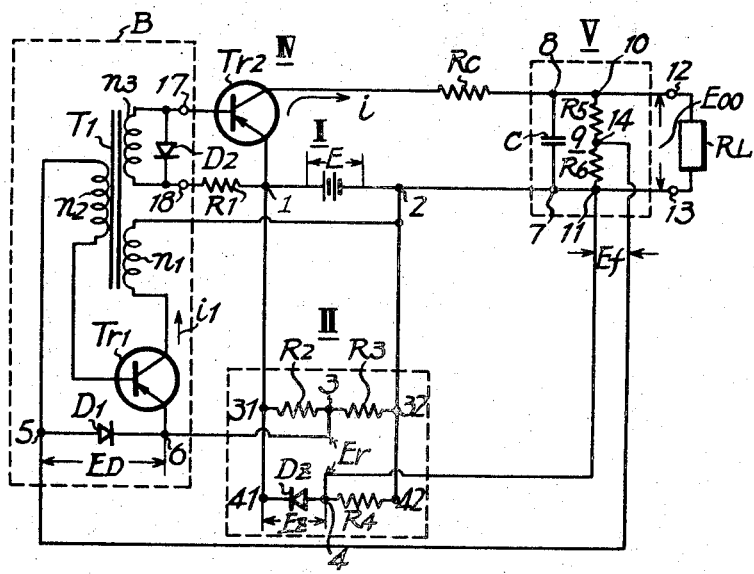

Also in the circuit illustrated in FIGURE 5, when an oscillator B keeps up free oscillation at its own repeating cycles, the condition of $E_f > E_r$ is satisfied in the steady state of the operation as in the circuit shown in FIGURE 4. In this circuit, for instance, the DC power source I may gradually vary over a certain voltage range, for example, from 8 v. to 12 v., for a long period of time. As described above, the blocking oscillator B oscillates when a control voltage signal $E_D$ impressed between the electrodes of a diode $D_1$ of the base-emitter circuit of a transistor $Tr_1$ is zero or reverse in direction (the side of a terminal 6 is positive and that of a terminal 5 is negative), and the oscillator does not oscillate while a positive voltage is impressed. Where the oscillation of the blocking oscillator is controlled by applying the control voltage signal thereto, control voltage $E_{D1}$ and $E_{D2}$ respectively for starting and stopping the oscillation slightly differ from each other in general. In this case, the oscillator continues to oscillate while the DC voltage $E_f$ is smaller than the reference voltage $E_r$ and it ceases to oscillate when $E_f$ slightly exceeds $E_r$. Then, the oscillator begins to oscillate again immediately when $E_f$ becomes smaller than $E_r$. In this example, however, the operation of the circuit will be explained, assuming that since the aforementioned control voltages $E_{D1}$ and $E_{D2}$ can be made substantially equal to each other with a suitable design, the oscillation starts and stops when $E_f = E_r$.

If the voltage of a capacitor C of a smoothing circuit V is smaller than that in the steady state and $E_f < E_r$ at the beginning of the operation of the circuit, the blocking oscillator B repeats its oscillation at its specific cycle $\tau_D$ and a switching transistor $Tr_2$ also repeats to conduct between its emitter and collector in synchronism with the oscillation, whereby the capacitor C being charged by the output current $i$ flowing between the emitter and collector from the DC power source I. The circuit elements of this circuit are designed in such a manner that the time constant $\tau$, for discharging the charge stored in the capacitor C through resistor elements $R_3$ and $R_4$ is sufficiently greater than the repeating cycle $\tau_D$ of the pulse current $i$ for charging the capacitor C, as previously described. Then, the inter-electrode voltage $E_{00}$ of the capacitor C increases every time charged and when $E_f$ finally exceeds $E_r$ a little the oscillator B immediately stops to oscillate and the transistor $Tr_2$ is cut off between its emitter and collector. Thus, after the charging current $i$ for the capacitor C has been cut off, the inter-electrode voltage $E_{00}$ very gradually decreases in amplitude and the DC voltage $E_f$ also decreases. When $E_f$ becomes equal to the reference voltage $E_r$ the oscillator B oscillates again. In the circuit in which the starting voltage $E_{D1}$ and the stopping voltage $E_{D2}$ for the oscillator B are substantially equal (it is easy to design the oscillator in such a manner) and the charging time constant $\tau_0$ of the capacitor C is small (if the internal resistance of the charging circuit of the capacitor C is $R_c$, $\tau_c = R_c C$), the oscillator B oscillates to produce a single shot of pulse at its output ends 17 and 18 and the DC voltage $E_f$ becomes greater than the reference voltage $E_r$ by a single charge of the capacitor C and immediately the oscillation ceases. The repeating cycle $\tau_0'$ of the subsequent charging current $i$ depends on the DC voltage E of the DC power source I. FIGURE 2 is a graph for explaining such operative conditions fundamentally. In FIGURE 2–A the output voltage E of the DC power source I is referred to as $E_c$, the reference voltage to $E_r$ and the voltage $E_f$ which is proportionate to the output voltage $E_{00}$ corresponding thereto is shown by the full line C. That is $E_f > E_r$ at a time $t_0$ and the oscillator B does not oscillator B does not oscillate, and the voltage $E_f$ gradually decreases with the lapse of time and becomes equal to the reference voltage $E_r$ at a time $t_1$. Simultaneously, a shot of pulse voltage having a pulse width $t_0$ such as shown by $a$ in the FIGURE 2–C is produced at the output ends 17 and 18 of the oscillator B and the transistor $Tr_2$ remains conductive for the positive half cycle $t_0$ of the pulse, so that the output voltage $E_c$ of the DC power source I is impressed between the electrodes of the capacitor C (this pulse voltage is designated at $b_1$). Accordingly, the voltage $E_f$ increases for a time from $t_1$ to $t_2$ and decreases again when the transistor $Tr_2$ is cut off between its emitter and collector at the time $t_2$. Then, when the voltage $E_f$ becomes equal to the reference voltage $E_r$, a pulse voltage is produced again at the output ends of the oscillator B to conduct the transistor $Tr_2$ and the voltage $E_c$ is impressed to the capacitor C. This pulse voltage is shown by $b_2$. Such operation is repeated and accordingly the voltage $E_f$ changes along the parts $C_1$, $C_2$, $C_3$ ... on the full line C. The increase of the voltage $E_f$ in the conducting period of the transistor $Tr_2$ depends upon the magnitude of the output voltage $E_c$ of the DC power source I. When the output voltage E of the DC power source I increases from $E_c$ to $E_d$, if the reference voltage $E_r$ is kept unchanged, the value of the voltage $E_f$ changes along the parts $C_1'$, $C_2'$, $C_3'$ ... on the dotted line $d$. The voltage values of $C_2'$ and $C_4'$ exceed those of $C_2$ and $C_4$ and accordingly at time $t_2$ to $t_5$ during which the voltage $E_2'$ decreases to a value equal to the voltage $E_r$ is also longer than that $t_2$ to $t_3$ in the foregoing. A mean value of the electrode voltage, namely the output voltage $E_{00}$ of the capacitor C also increases a little. If now the terminal voltage $E_z$ of the Zener diode $D_z$ is used as the reference voltage $E_r$, the reference voltage $E_r$ also increases a little up to $E_{z1}$ in response to the output voltage of the DC power source I, and hence the mean value $\overline{E_{00}}$ of the output voltage $E_{00}$ increases more than that when the reference voltage $E_r$ is constant. In this circuit, however, the reference voltage $E_r$ is so selected as to decrease with an increase in the voltage E in the reference voltage generator circuit shown in FIGURE 5, so the mean value of the output voltage $E_{00}$ can be held at a constant value independently of the variation of the DC voltage E. This relationship can be explained by using mathematical formulas as follows:

The reference voltage $E_r$ in the reference voltage generator circuit II shown in FIGURE 5 can be expressed by the following formula, with reference to FIGURE 3:

$$E_r = E_z - \frac{R_2}{R_2 + R_3} E \qquad (1)$$

where $E_z$ is a terminal voltage of the Zener diode $D_z$. If the Zener voltage of the diode is expressed by $E_{z0}$, the inter-electrode voltage $E_z$ of the Zener diode $D_z$ in a range that a greater voltage than $E_{z0}$ is produced by the output voltage E of the DC power source I between the terminals of the diode, can be expressed by the following Formula (2):

$$E_z = E_{z0} + Z(E - E_0) \qquad (2)$$

where Z is the ratio of the amount $\Delta E_z$ of increase of the voltage $E_z$ to that $\Delta E$ of the output E, namely $\Delta E_z / \Delta E$ and it was about 5% in the Zener diode used in practice. $E_{z0}$ is a constant voltage peculiar to the Zener diode and it was 7.5 volts in the diode used in our experiment $E_0$ is a value of the output voltage E of the DC power source I with respect to the voltage $E_{z0}$. Accordingly, the Formula (1) can be expressed as follows:

$$E_r = (E_{z0} + -ZE_0) - \left(\frac{R_2}{R_2 + R_3} - Z\right)E \qquad (3)$$

The mean value $\overline{E_{00}}$ of the output voltage $E_{00}$ can be expressed by the following Formula (4).

$$\overline{E_{00}} = \left(1 - \frac{t_0}{2\tau_c}\right) E_r + \frac{t_0}{2\tau_c} E$$

$$= \left(1 - \frac{t_0}{2\tau_c}\right)(E_{z0} - ZE_0)$$

$$- \left\{\left(1 - \frac{t_0}{2\tau_c}\right)\left(\frac{R_2}{R_2 + R_3} - Z\right) - \frac{t_0}{2\tau_c}\right\} E \qquad (4)$$

where, $\tau_c$ is a time constant for charging the capacitor C and $t_0$ is a pulse width of the output voltage of the oscillator, and $\tau_c > t_0$.

Therefore, if $R_2$ and $R_3$ are so selected that the second term of the right side of the Formula (4) may become zero, the mean value $\overline{E_{00}}$ is independent of the output voltage E of the DC power source. In this case, $$\frac{R_2}{R_2+R_3} > Z$$

and the reference voltage $E_r$ decreases with the increase in the voltage E and the relationship between E and $E_r$ becomes as shown by the chain line in FIGURE 3. In our embodiment of this invention $R_2$, $R_3$ and $R_4$ were selected respectively 50Ω, 2KΩ and 2.4KΩ, and the variation of the mean value $\overline{E_{00}}$ of the output voltage was less than 1% in the range of variations from 8 v. to 15 v. of $E_1$. Also in a range that the load resistor $R_L$ varied from 0.5MΩ to 100MΩ the variation of the mean value $\overline{E_{00}}$ was less than 1%. As shown in FIGURE 4, by connecting the primary coil of the boosting transformer $T_2$ between the collector electrode of the switching transistor $Tr_2$ and the output terminal 2 of the DC power source I and connecting the both ends of the secondary coil of the transformer to the electrode of the capacitor C through the rectifier $D_3$, the amplitude of the DC output voltage $E_{00}$ produced at the output terminals 12 and 13 can be boosted higher than the output voltage E of the DC power source I. Therefore, in this circuit a dry element battery of a relatively low output voltage E (for example, several volts or so) is employed as the DC power source, by which a constant DC voltage of about 100 v. can be obtained at the output terminals 12 and 13. Accordingly, the circuit of this invention is suitable for use as a measuring power source of portable insulation resistance testers including a dry element battery therein.

It will be apparent that many modifications and variations may be effected without departing from the scope of the novel concept of this invention.

What is claimed is:
1. A direct current voltage device comprising:
    a power source of direct current voltage;
    reference generator circuit means including a Zener diode connected to said power source to develop a fixed value direct current reference voltage;
    a blocking oscillator circuit including a semiconductor device having an input electrode, an output electrode and a common electrode which is common to both said input and output electrodes, said output electrodes connected to said power source, and further including a pair of output terminals for developing thereacross pulses in response to operation of said blocking oscillator;
    a coupling circuit having input and output terminals;
    a filter circuit having input terminals connected to the output terminals of said coupling circuit and output terminals arranged for connection to a load;
    a semiconductor switching circuit having the input thereof connected to said pair of terminals of said blocking oscillator and an output thereof connected in series with said power source and the input of said coupling circuit;
    impedance means in said filter circuit to develop a feedback voltage proportional to the voltage applied to the load; and
    a diode connected between the input electrode and the common electrode of said semiconductor of said blocking oscillator and in series with said Zener diode and said impedance means, whereby, the voltage developed by said Zener diode and said impedance means is added together and applied to said diode to control the operation of said blocking oscillator circuit.

2. A direct current constant voltage device according to claim 1 wherein said coupling circuit includes a transformer having the primary winding thereof connected to said switching circuit and the secondary thereof connected to said filter circuit.

3. A direct current constant voltage device according to claim 1 wherein said reference generator circuit means is formed of a bridge circuit which consist of three arms of resistance and one arm of said Zener diode, the respective outer terminals of the series circuit of the two resistors of the three resistors and the series circuit of the remaining resistor and said Zener diode being connected across said power source, and wherein the respective inner circuit points of the two series connected legs being connected to the input circuit of the semiconductor device of said blocking oscillator.

References Cited

UNITED STATES PATENTS

| | | | |
|---|---|---|---|
| 3,290,583 | 12/1966 | Sinclair | 323—22 |
| 3,260,924 | 7/1966 | Bridgeman | 323—22 |
| 3,179,871 | 4/1965 | Bagno | 323—22 |
| 3,072,837 | 1/1963 | Hakimoglo | 323—22 |
| 2,979,653 | 4/1961 | Wilcox et al. | 323—22 |

ORIS L. RADER, *Primary Examiner.*

H. HUBERFELD, *Assistant Examiner.*